United States Patent [19]

Chamberlain et al.

[11] 4,078,394

[45] Mar. 14, 1978

[54] CRYOGENIC FREEZER

[75] Inventors: William C. Chamberlain, Chelmsford, Mass.; James A. Sneller, Sr., Torrance, Calif.

[73] Assignee: J. W. Greer, Inc., Hudson, N.H.; by said William C. Chamberlain

[21] Appl. No.: 700,751

[22] Filed: Jun. 29, 1976

[51] Int. Cl.² .............................................. F25B 41/00
[52] U.S. Cl. ........................................ 62/203; 62/381
[58] Field of Search .................. 62/203, 208, 378, 381

[56] References Cited

U.S. PATENT DOCUMENTS

| | | | |
|---|---|---|---|
| 1,429,435 | 9/1922 | Jones | 62/381 |
| 3,315,492 | 4/1967 | Dreksler | 62/381 |
| 3,412,476 | 11/1968 | Astrom | 62/381 |
| 3,769,805 | 11/1973 | Corini | 62/381 |
| 3,866,432 | 2/1975 | Harrison | 62/381 |

*Primary Examiner*—Ronald C. Capossela
*Attorney, Agent, or Firm*—Morse, Altman, Oates & Bello

[57] ABSTRACT

A cryogenic freezer with an enclosed chamber into which a freezing fluid is directed through selectively controlled nozzles towards a propeller fan and baffle assemblage that is coaxial with a rotating drum having graduated perforations distributed about its periphery. The drum carries an endless belt which travels in a spiral path about the periphery of the drum and which defines tiers for carrying products to be processed. The freezing fluid passing through the nozzles is directed towards the discharge side of the propeller fan and is guided to the outside perimeter of the moving belt by the baffles. The freezing fluid passes across the product tiers and through the graduated perforations into the center of the drum where it is drawn upwardly by the fan and mixed with incoming freezing fluid.

10 Claims, 3 Drawing Figures

CRYOGENIC FREEZER

BACKGROUND OF THE INVENTION

1. Field of Invention:

The present invention relates to freezer systems and, more particularly, is directed towards cryogenic freezer systems.

2. Description of the Prior Art:

Cryogenic freezer systems of various configurations have been manufactured for the food processing industry. Such systems have been introduced with varying degrees of success due to certain disadvantages such as excessive snow, nonuniform freezing and ice buildup. A need has arisen for improvements in cryogenic freezing systems.

SUMMARY OF THE INVENTION

It is an object of the present invention to provide a cryogenic freezer system which does not suffer from the heretofore mentioned disadvantages.

Another object of the present invention is to provide a crygenic freezer system with an enclosed chamber into which a freezing fluid, such as carbon dioxide vapor, is introduced selectively through nozzles distributed in the roof of the chamber. A rotating drum within the chamber carries a moving belt, which defines tiers for carrying products to be processed. The moving belt is supported on radially disposed arms and travels in a spiral path about the periphery of the drum. The freezing fluid in the chamber is circulated downwardly about the exterior walls of the drum and upwardly within an interior cavity of the drum. The carbon dioxide vapor from the nozzles is directed towards the discharge side of a propeller fan that is coaxial with the rotational axis of the drum. Baffles disposed about the propeller fan constitute a shroud for directing freezing fluid drawn from within the drum by the fan and carbon dioxide vapor emitted from the nozzles towards the outer perimeter of the moving belt and downwardly towards the product tiers for minimum snow formation. The drum is formed with graduated perforations about its periphery, the perforations extend in decreasing size from the bottom to the top of the drum. The discharged air and carbon dioxide mixture passes over the product tiers and into the drum cavity through the graduated perforations which provide uniform velocity of the freezing medium across the tiers.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
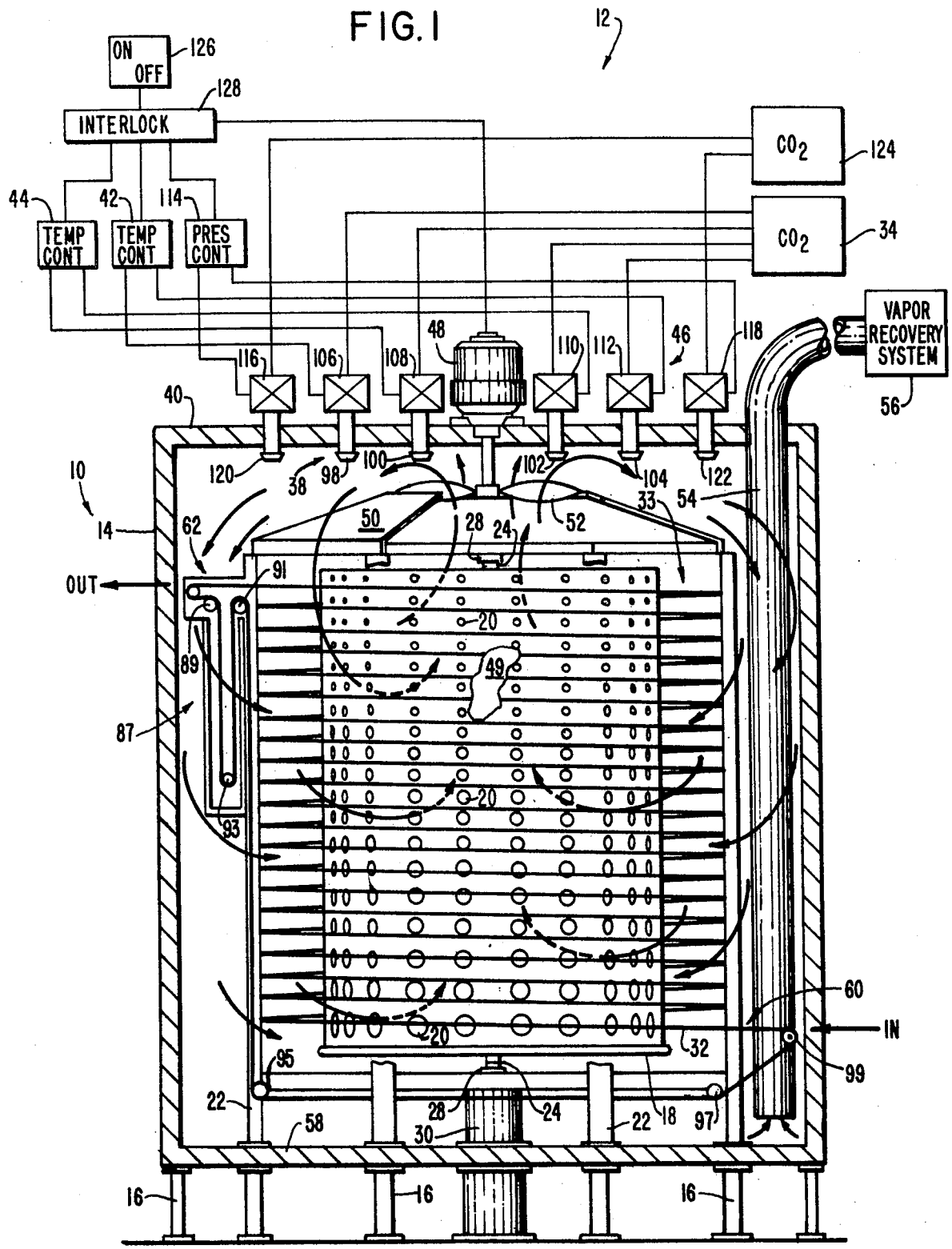
FIG. 1 is a schematic diagram of a cryogenic freezer system embodying the present invention.

Referring now to the drawings, particularly FIG. 1, there is shown a cryogenic freezing system comprising a freezer 10 and a control system 12. Freezer 10 includes a sealed chamber 14, composed of stainless steel for example, which is supported on legs 16. A rotatable, open ended housing 18, for example a drum, having graduated ports or perforations 20 about its periphery is mounted within chamber 14, an open frame 22 surrounding the drum. Drum 18 is rotatable on an axle 24, opposite ends of the axle being received in flange bearings 26, 28. A post 30, which supports flange bearing 26, extends inwardly of chamber 14. An endless belt 32 of a conveyor 33 is supported by frame 22 and is wound about drum 18. As hereinafter described, belt 32, which defines tiers for carrying products to be processed, travels in a spiral path about drum 18 at a rate which is less than the rotational rate of the drum.

In operation of the freezer system, a freezing medium, for example carbon dioxide, stored in a tank 34 is introduced into chamber 14 through a nozzle assemblage 38 mounted in a roof 40 of the chamber. Temperature controllers 42 and 44 selectively actuate a valve assemblage 46 associated with nozzle assemblage 38 for controlling carbon dioxide vapor entering chamber 14. The carbon dioxide vapor introduced through nozzle assemblage 38 is directed towards the discharge side of a propeller fan 48 that is positioned over drum 18 coaxial with the axis of revolution of the drum. Baffles 50, which are mounted to frame 22 about blades 52 of fan 48, direct discharged air mixed with carbon dioxide vapor to the outside perimeter of spiral conveyor 33 and down to the product tiers for minimum snow formation. The freezing medium passes across the product tiers and through graduated perforations 20 into an interior cavity 49 of drum 18, the cavity being opened at opposite ends of the drum. In order to provide uniform velocity of the freezing medium passing over the product tiers, the largest diameter perforations are at the bottom of drum 18 and the perforations decrease in diameter towards the top of the drum. The freezing medium passing through perforations 20 is drawn upwardly into cavity 49 of drum 18 by fan 48, is mixed with the carbon dioxide vapor emitted from nozzle assemblage 38, and is circulated within chamber 14. A large diameter vapor exhaust duct 54 is connected to a carbon dioxide vapor recovery system 56. Duct 54, which extends into chamber 14 through roof 40 within six inches of a floor 58 of the chamber, is adjustable for optimum positioning. In the illustrated embodiment, the products to be processed are carried on belt 32 from an inlet station 60 at a lower end of chamber 14 to an output station 62 at an upper end of the chamber. Inlet station 60 and outlet station 62 constitute portions of product belt 32 that lie in a tangential path with respect to drum 18.

Figure 2:
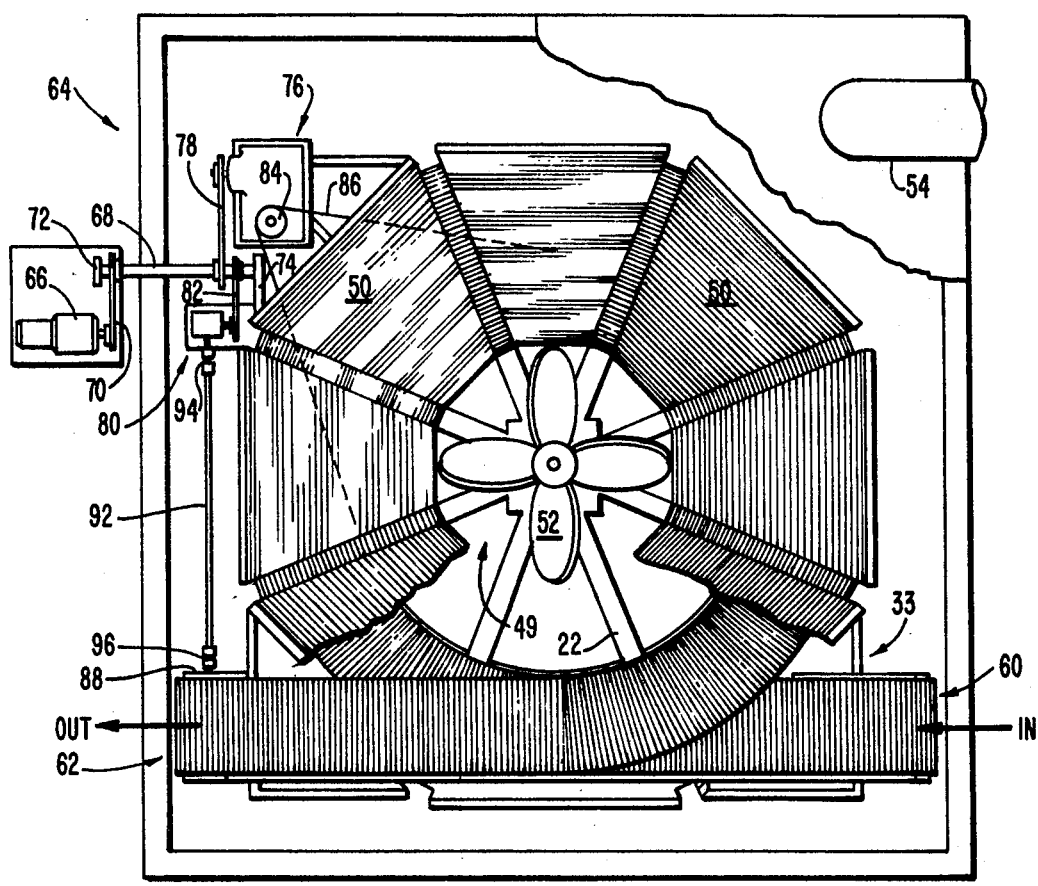
FIG. 2 is a tip plan view of the freezer of FIG. 1.
Figure 3:
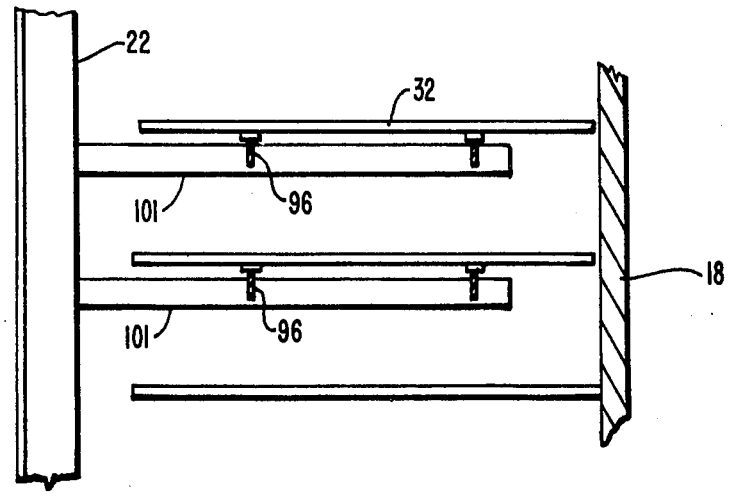
FIG. 3 is a side elevation showing tiers for carrying products to be processed.

Referring now to FIG. 2, it will be seen that belt 32 and drum 18 are driven by a drive mechanism 64 which includes a motor 66 that is drivingly connected to a journaled shaft 68 by an endless belt 70. Opposite ends of shaft 68 are received within bearing blocks 72 and 74. Shaft 68 is drivingly connected to a transmission assembly 76 by an endless belt 78 and to a transmission assembly 80 by an endless belt 82. Transmission assembly 76 is provided with a drive wheel 84 which carries an endless belt 86 that is in driving engagement with drum 18 for rotating the drum. A drive roller 88 is drivingly connected to transmission assembly 80 by a shaft 92. Opposite ends of shaft 92 are connected to transmission assembly 80 and drive roller 88 by universal joints 94 and 96, shaft 92 extending upwardly from transmission assembly 80 to drive roller 88. In the illustrated embodiment, drive roller 88 is a positive drive sprocket that engages product belt 32, for example a flexible stainless belt with interconnecting links and sprocket holes. Associated with drive roller 88 is a gravity take-up system 87 through which belt 32 is threaded. Gravity take-up system includes a pair of upper rollers 89, 91 and a biased lower roller 93, belt 32 passing sequentially over roller 89, under roller 93 and over roller 91. Then, belt 32 passes under rollers 95, 97 and 99 at the lower portion of chamber 14 and into inlet station 60. As shown in FIG. 3, frame 22 includes a plurality of radially disposed arms 101 having guides 96 which carry product belt 32. In order to prevent binding of product belt 32 against the periphery of drum 18, the rate at which the drum rotates is at least equal to the travel rate of the product belt. Preferably, drum 18 rotates at a rate which is greater than the travel rate of product belt 32.

Referring again to FIG. 1, it will be seen that nozzle assemblage 38 includes nozzles 98, 100, 102 and 104 and that valve assemblage 48 includes valves 106, 108, 110 and 112, one valve being associated with one nozzle. It is to be understood that, in alternative embodiments, the number of nozzles and valves is other than four, for example six, eight or some other number. Temperature controller 42 controls valves 106 and 112 which are associated with nozzles 98 and 104, respectively. Temperature controller 44 controls valves 108 and 110 which are associated with nozzles 100 and 102, respectively. Temperature controllers 42 and 44 are set at different operating temperatures, for example 2° F apart, each temperature controller operating one half of the valves in valve assemblage 46. The arrangement of temperature controller settings is such that one half of the valve assemblage operates continuously and the other half of the valve assemblage cycles intermittently to maintain set point temperature. In addition, control system 12 provides positive pressure within chamber 14 at all times and minimizes infiltration of outside air and moisture in order to prevent excessive accumulation of frost on the products being processed. As an additional safety factor, there is provided a separate vapor carbon dioxide injection system which includes a pressure controller 114 that is connected to valves 116 and 118 having nozzles 120 and 122, respectively. Carbon dioxide is supplied to valves 116 and 118 from a tank 124. In the event that the pressure within chamber 14 drops below the normal operating pressure, pressure controller 114 actuates valves 116 and 118. In consequence, carbon dioxide vapor is introduced into chamber 14 through nozzles 120 and 122.

In the preferred embodiment, fan 48 and drive motor 66 are variable speed devices that provide means for varying the product freeze rates. Fan 48 and drive motor 66 are mounted external of chamber 14, shaft, nozzle and duct openings being sealed. As shown in FIG. 1, operation of the cryogenic freezer is controlled from an ON/OFF switch 126 that is associated with an interlock 128 which prevents actuation of the carbon dioxide cooling system unless fan 48 is started. Although one drum is shown in the illustrated embodiment, it is to be understood that, in alternative embodiments, more than one drum and associated spiral conveyor is mounted within the freezing chamber.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A cryogenic freezer system for product processing, said system comprising:
   (a) a sealed chamber;
   (b) control means mounted to said chamber for introducing a freezing fluid into an upper portion of said chamber;
   (c) an open ended housing rotatably mounted within said chamber, said housing having an internal cavity extending between said open ends, a plurality of ports disposed about the periphery of said housing;
   (d) an endless belt disposed about the periphery of said housing;
   (e) drive means operatively connected to said housing and said belt, said drive means rotating said housing and moving said belt, said belt traveling in a spiral path about said housing, the relative movement of said housing and belt being such as to prevent binding of said belt against said housing; and
   (f) means for directing said freezing fluid introduced at an upper portion of said chamber outwardly towards an outer perimeter of said endless belt disposed about said housing, across said endless belt and inwardly through said ports into said cavity.

2. The system as claimed in claim 1 wherein said control means includes controller means, valve means and nozzle means, said valve means having activated and deactivated states, said controller means controlling the state of said valve means, said freezing fluid applied to said nozzle means through said valve means in said activated state, said freezing fluid introduced into said upper portion of said chamber through said nozzle means which are mounted to a roof of said chamber.

3. The system as claimed in claim 2 wherein said means for directing includes fan means for circulating said freezing fluid in said chamber, said nozzle means diposed about said fan means, said fan means having an input side and a discharge side, said freezing fluid introduced into said chamber on said discharge side of said fan means, said freezing fluid in said cavity is directed outwardly towards the outer perimeter of said belt and is drawn inwardly through said ports towards said input side of said fan means.

4. The system as claimed in claim 2 wherein said means for directing includes fan means and deflection means, said fan means having rotating blades which are disposed within said chamber above said housing, said blades rotating about an axis which is coaxial with the axis about which said housing rotates, said deflection means mounted within said chamber about said rotating blades, said fan means having a discharge side and an input side, said freezing fluid introduced into said upper portion of said chamber on said discharge side, said freezing fluid is directed outwardly of said belt by said deflection means and is drawn inwardly across said belts through said ports into said internal cavity of said housing and towards said input side of said fan means by said fan means.

5. The system as claimed in claim 1 wherein said ports are graduated openings extending from a lower end to an upper end of said housing in decreasing size for providing uniform flow velocity of said freezing fluid across said endless belt.

6. A cryogenic freezer system for product processing, said system comprising:
(a) a sealed chamber;
(b) control means mounted to said chamber for introducing a freezing fluid into an upper portion of said chamber;
(c) an open ended drum rotatably mounted to said chamber, said drum having an internal cavity extending between said open ends, a plurality of graduated perforations formed about the periphery of said drum;
(d) an endless belt, portions of said belt disposed about the periphery of said drum in a spiral configuration, other portions of said belt being tangential to said drum, said other portions consititituting inlet and outlet stations for the product being processed;
(e) drive means operatively connected to said drum and said belt, said drive means rotating said drum and moving said belt, said belt traveling in a sprial path about said drum, the relative movement of said drum and belt being such as to prevent binding of said belt against said drum; and
(f) means for directing said freezing fluid introduced at an upper portion of said chamber outwardly towards an outer perimeter of said endless belt disposed about said drum, across said endless belt and inwardly through said perforations into said internal cavity.

7. The system as claimed in claim 6 wherein said control means includes controller means, at least two valve means and at least two nozzle means, one of each said valve means associated with one of each said nozzle means, each said valve means having activated and deactivated states, said controller means controlling the state of said valve means, said nozzle means mounted to a roof of said chamber, said freezing fluid applied to said nozzle means through said valve means in said activated state, said freezing fluid introduced into said upper portion of said chamber through said nozzle means.

8. The system as claimed in claim 7 wherein one of said valve means operates continuously in said activated state and the other of said valve means operates intermittently between said activated and deactivated states.

9. The system as claimed in claim 6 wherein said means for directing includes fan means and deflection means, said fan means having rotating blades which are disposed within said chamber above said drum, said blades rotating about an axis which is coaxial with the axis about which said drum rotates, said deflections means mounted within said chamber about said rotating blades, said fan means having a discharge side and an input side, said freezing fluid introduced on said discharge side of said fan means and directed towards said deflection means, said freezing fluid directed outwardly of said belt by said deflection means is drawn inwardly across said endless belt and through said perforation into said internal cavity and towards said input side of said fan means by said fan means.

10. They system as claimed in claim 9 wherein said perforations are graduated perforations extending from a lower end to an upper end of said drum in decreasing size for providing uniform flow velocity of said freezing fluid across said endless belt.

* * * * *